United States Patent
Bowen

(10) Patent No.: US 7,100,722 B2
(45) Date of Patent: Sep. 5, 2006

(54) WHEEL ASSEMBLY INCLUDING A DC MOTOR MOUNTED WITHIN THE HUB AND DRIVE CONNECTED TO THE WHEEL

(75) Inventor: Dale R. Bowen, Southington, OH (US)

(73) Assignee: Peerless-Winsmith, Inc., Warren, OH (US)

( * ) Notice: Subject to any disclaimer, the term of this patent is extended or adjusted under 35 U.S.C. 154(b) by 349 days.

(21) Appl. No.: 10/320,453

(22) Filed: Dec. 17, 2002

(65) Prior Publication Data

US 2004/0112656 A1 Jun. 17, 2004

Related U.S. Application Data

(60) Provisional application No. 60/406,692, filed on Aug. 29, 2002.

(51) Int. Cl.
*B60K 1/00* (2006.01)

(52) U.S. Cl. ...................................................... 180/65.5
(58) Field of Classification Search ................ 180/65.1, 180/65.5, 65.6, 253; 310/218, 259, 83
See application file for complete search history.

(56) References Cited

U.S. PATENT DOCUMENTS

| | | | |
|---|---|---|---|
| 638,643 A | 12/1899 | Newman et al. | |
| 1,976,308 A | 10/1934 | Thomas | |
| 2,258,328 A * | 10/1941 | Lee et al. | 180/253 |
| 2,608,598 A | 8/1952 | Hawkins et al. | |
| 3,055,448 A | 9/1962 | Fagel | |
| 3,163,250 A * | 12/1964 | Gibson | 180/253 |
| 3,370,668 A | 2/1968 | Goodacre | |
| 3,608,661 A * | 9/1971 | Arnot | 477/21 |
| 3,812,928 A | 5/1974 | Rockwell et al. | |
| 3,892,300 A * | 7/1975 | Hapeman et al. | 180/65.5 |
| 3,898,491 A * | 8/1975 | Long et al. | 310/183 |
| 4,930,590 A | 6/1990 | Love et al. | |
| 5,729,072 A * | 3/1998 | Hirano et al. | 310/258 |
| 6,219,900 B1 * | 4/2001 | Suzuki | 29/598 |
| 6,367,571 B1 * | 4/2002 | Schwarz | 180/253 |

FOREIGN PATENT DOCUMENTS

| | | | |
|---|---|---|---|
| DE | 3826933 | * | 2/1990 |
| JP | 8-317593 | * | 11/1996 |

OTHER PUBLICATIONS

"The Quality Source", Peerless–Winsmith, Inc., 1 page.

* cited by examiner

*Primary Examiner*—Bryan Fischmann
(74) *Attorney, Agent, or Firm*—Alfred J. Mangels

(57) ABSTRACT

A modular, self-driven vehicle wheel assembly including a drive motor carried by the wheel assembly. The assembly includes a hub, a wheel rotatably mounted on the hub, and a planetary speed-reducing unit mounted on the hub and drivingly connected with the wheel. The drive motor is a shunt wound DC motor that is coaxially mounted adjacent to the wheel and within a chamber formed in the hub. The motor is drivingly connected with the planetary speed-reducing unit to transmit motor torque to rotate the wheel in either a forward direction or a reverse direction. A brake assembly is carried adjacent to the motor for selectively applying a braking force to brake the motor armature when the wheel is to remain in a stationary condition.

15 Claims, 5 Drawing Sheets

WHEEL ASSEMBLY INCLUDING A DC MOTOR MOUNTED WITHIN THE HUB AND DRIVE CONNECTED TO THE WHEEL

RELATED APPLICATIONS

This application is a continuation-in-part of copending provisional application Ser. No. 60/406,692, filed on Aug. 29, 2002, the disclosure of which is incorporated herein by reference in its entirety, the benefit of its earlier filing date being hereby claimed according to 37 C.F.R. §1.78(4).

BACKGROUND OF THE INVENTION

The present invention relates to a wheel assembly for use in vehicles such as a scissor lift and more particularly relates to a modular wheel assembly which includes a wound field DC motor mounted within the hub of the assembly and directly driving the wheel via an intermediate planetary gear mechanism.

In the past, the wheels of such vehicles have been driven primarily by external hydraulic motor systems connected to the wheels by intermediate adapter components. These systems tend to be mechanically complicated and expensive and utilize space on the vehicle which could be more efficiently occupied by other components. Various type wheel assemblies which include conventional AC or DC electric motors and planetary speed reducer units to drive the wheel have also been previously proposed, but those assemblies have not been widely accepted commercially. For example, prior conventional wound field DC motors consisted of thick machine frames drilled with holes to mount laminated field pole pieces and end housings. The poles were laminated to reduce eddy current losses and were punched from electrical grade silicon steel. The pole pieces were then stacked and welded on both sides. To bolt the pole pieces into the frame they had to be drilled and tapped. Installing field coils around each pole piece and bolting them into the frame completed the assembly. The result was a large, heavy, very costly, labor intensive motor which did not lend itself for application for use in a wheel assembly.

The industry recognizes the desirability of utilizing such modular wheel drives, but requires that the components of the assembly, particularly the parts of the DC motor, be minimized in number, size, and weight to provide a cost effective, compact design which is capable of satisfying the required horsepower and torque requirements of the vehicle.

The invention as described hereinbelow was developed to satisfy that need.

SUMMARY OF THE INVENTION

Accordingly, the primary object of this invention is to provide a novel modular wheel drive assembly which includes a unique lightweight, compact DC motor mounted within the hub of the assembly.

Another object of the invention is to provide the above assembly in which the motor drives the wheel through an intermediate planetary gear unit and wherein the components of the motor and gear unit are minimized by sharing common parts.

Still another object of the invention is to provide the above assembly in which an electrical holding/emergency brake is mounted at the rear end of the motor and is released when the motor is energized.

A further object of the invention is to provide the above assembly wherein the motor is a separately excited shunt wound DC motor used with an electronic controller to provide more speed and better control.

Other objects and advantages will become apparent from reading the following detailed description of the invention wherein reference is made to the accompanying drawing.

DETAILED DESCRIPTION OF THE INVENTION

Figure 1:
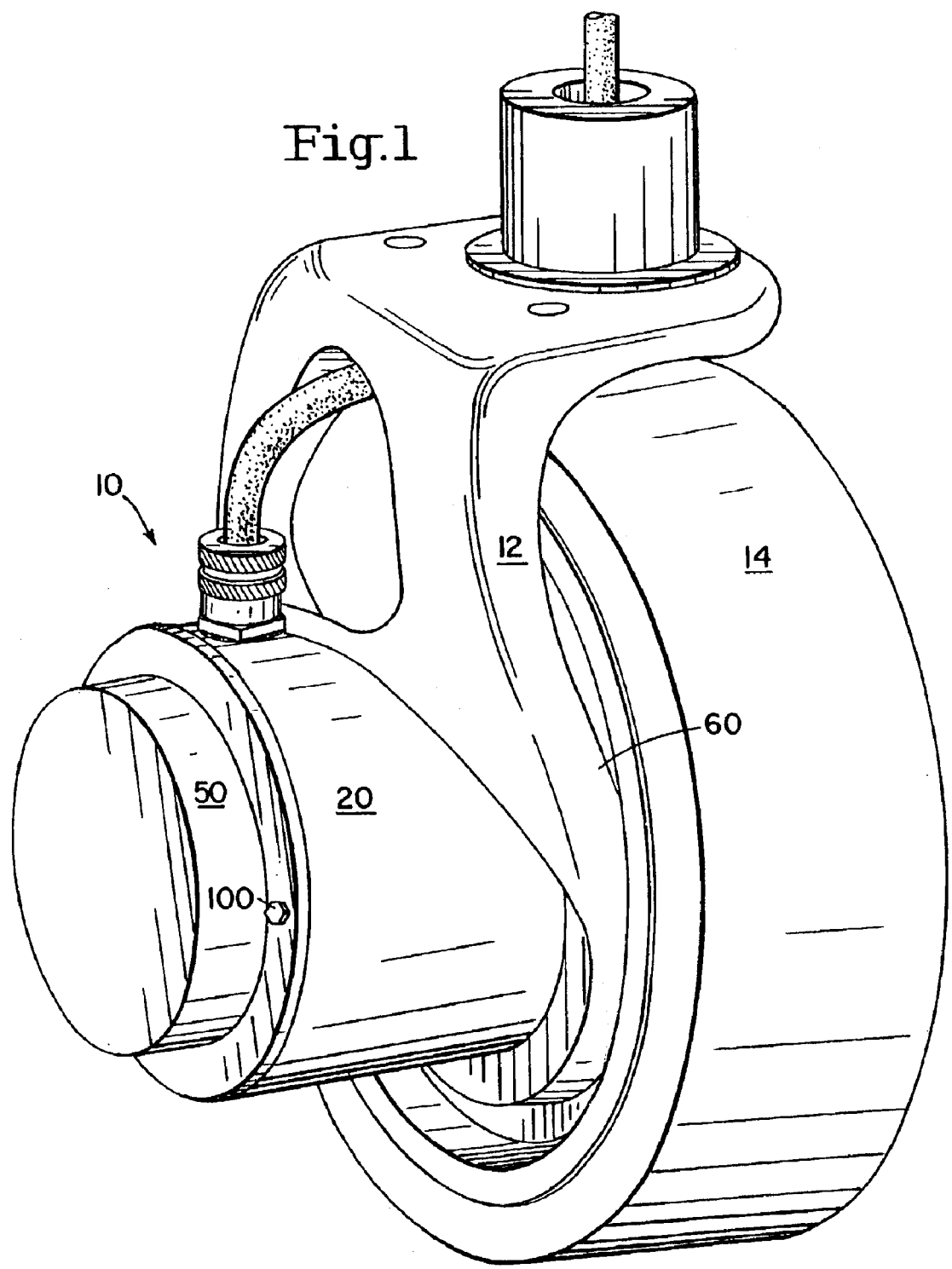
FIG. 1 is a generally perspective view of the outer end of the wheel assembly illustrating the manner in which the motor mounts within the hub.

Referring now to the drawings, wheel assembly 10 includes a hub 12 having a first cylindrical outer section 60 and a second reduced diameter cylindrical inner section 62. Section 60 has an inner bore 64, an end wall 66, and a larger outer counterbore 68. Bore 64, end wall 66, and counterbore 68 define a chamber 69. A smaller stepped central bore 70 extends through wall 66 and inner section 62. A wheel 14 (about 12"–18" in diameter) is fastened via cap screws 15 to a ring 16 which is rotatably mounted via bearings 18 on the outer diameter of hub section 62.

A separately excited shunt wound DC motor 20 is mounted within chamber 69 of hub section 60 and includes a rotatable armature 21 having coils 23 and a shaft 24 whose inner drive end 22 is drive connected to the sun gear of a planetary speed reducer assembly 26 which rotates ring 16 and wheel 14 when motor 20 is energized. Planetary assembly 26 is fastened to hub section 62.

Figure 2:
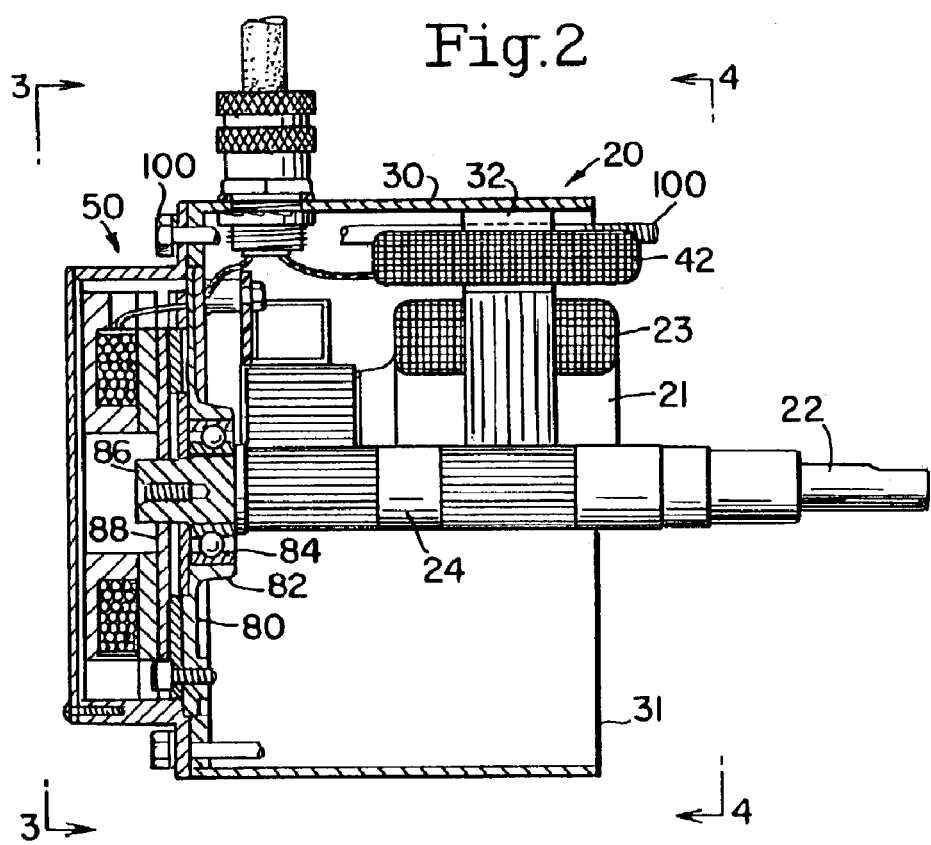
FIG. 2 is a fragmentary sectional view of the motor used in the assembly of the invention.
Figure 3:
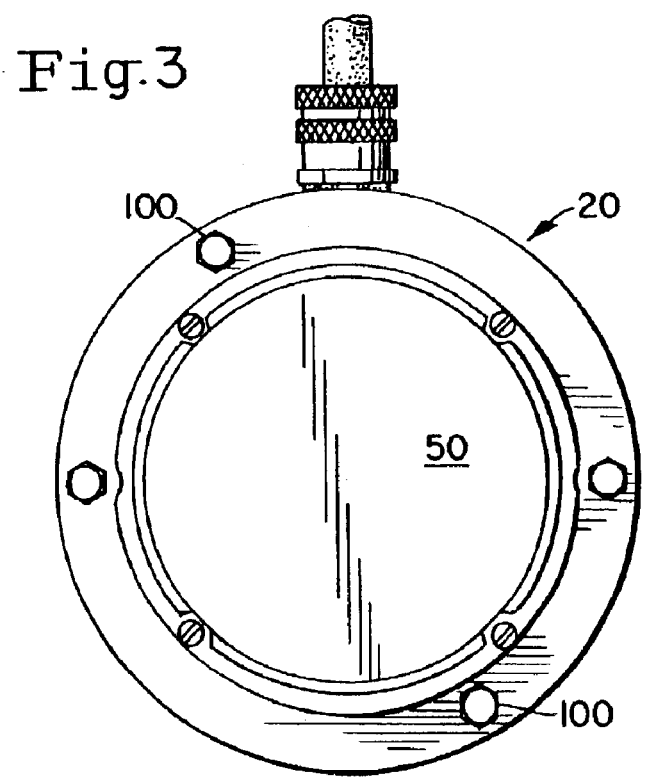
FIG. 3 is an outer end view taken along line 3—3 of FIG. 2.
Figure 4:
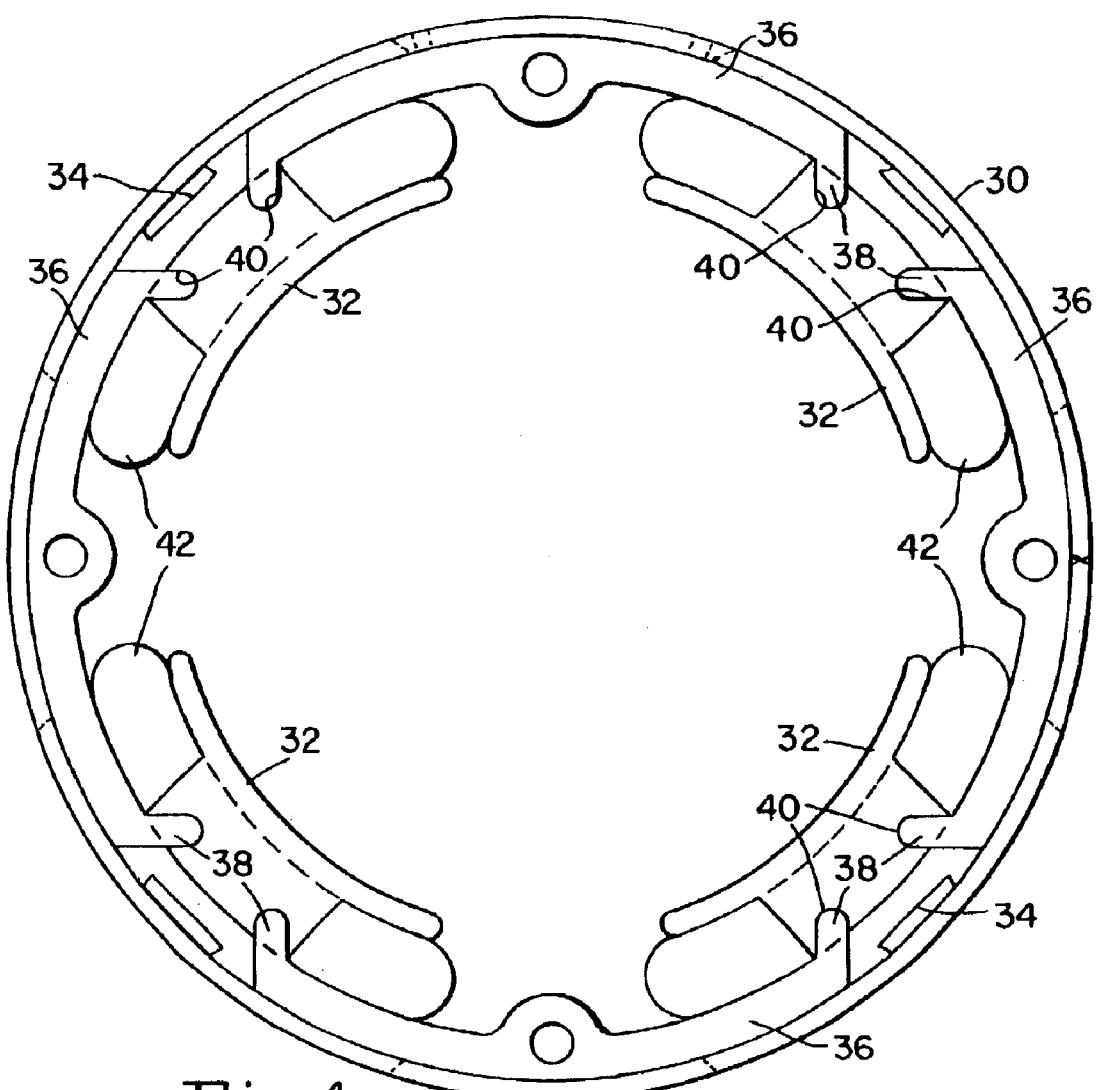
FIG. 4 is a view taken along line 4—4 of the inner open end of the motor schematically illustrating the stationary field coil assembly.
Figure 5:
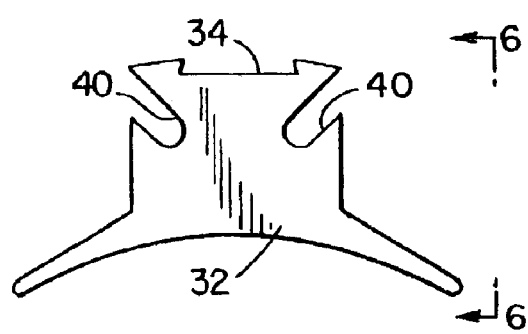
FIG. 5 is an end view of the powdered metal pole piece used in the invention.
Figure 6:
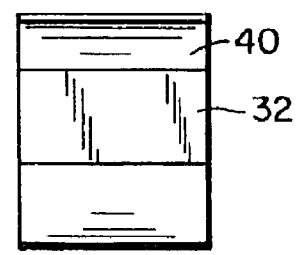
FIG. 6 is a side view of the pole piece taken along line 6—6 of FIG. 5.

The separately excited shunt wound motor 20 (FIGS. 2, 3, and 4) is specially designed for this application and includes an inexpensive cylindrical rolled steel shell 30 of about ⅛" thickness, seam welded at its abutting edges, which replaces the thick machine frame of the prior DC motors. The thin laminated field pole pieces of the prior motors are replaced by 1" long powdered metal pole pieces 32 (FIGS. 5 and 6), the powder being in conformity with MPIF (Metal Powder Industries Federation) Standard No. 35, and of grade 45P within that standard, which reduces the eddy current losses similar to the laminations in prior standard motor field pole construction. When more than one pole piece 32 is desired at a pole location, (for example, two stack) the pole pieces are aligned side by side in the axial direction through the use of a "cleat" or bar placed in a recess 34 to properly align the adjacent pole pieces 32. This eliminated the necessity of welding the pole pieces as in the prior DC motors.

Figure 7:
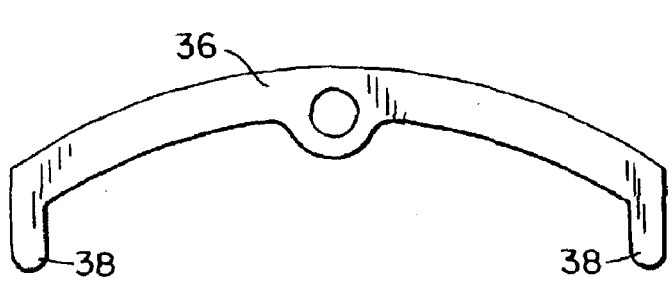
FIG. 7 is an end view of the interlocking powdered metal pole segment for locking the pole pieces together in assembly.
Figure 8:
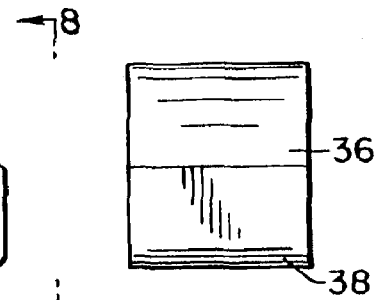
FIG. 8 is a view taken along line 8—8 of FIG. 7 of the interlocking powdered metal pole segment.

The pole pieces 32 are then interlocked together through the use of an interlocking powdered metal pole segment 36 (FIGS. 7 and 8) which has end lugs 38 that fit within slots 40 on pole pieces 32 to hold the pole pieces together in proper angular relationship. Using a special fixture, copper field coils 42 are assembled on poles 32 and the entire assembly including the powdered metal pole pieces 32, the powdered metal interlocking pole segments 36, and field coils 42 is then hydraulically pressed and fixed into the rolled steel shell 30. The interlocking powdered metal pole segments 36 also form part of the magnetic path within the motor. The inner drive end 31 of shell 30 remains open.

The outer end of shell 30 is closed by an end plate 80 having a central hub 82 mounting bearing 84 rotatably supporting the outer end 86 of shaft 24.

An electrically operated holding/emergency brake assembly 50 is removably fastened to end plate 80 as an integral part of motor 20 and includes a disc 88 fixed on outer end 86 of armature shaft 24. Brake assembly 50 normally holds disc 88, shaft 24, and armature 21 stationary and releases the disc when motor 20 is energized.

Figure 1A:
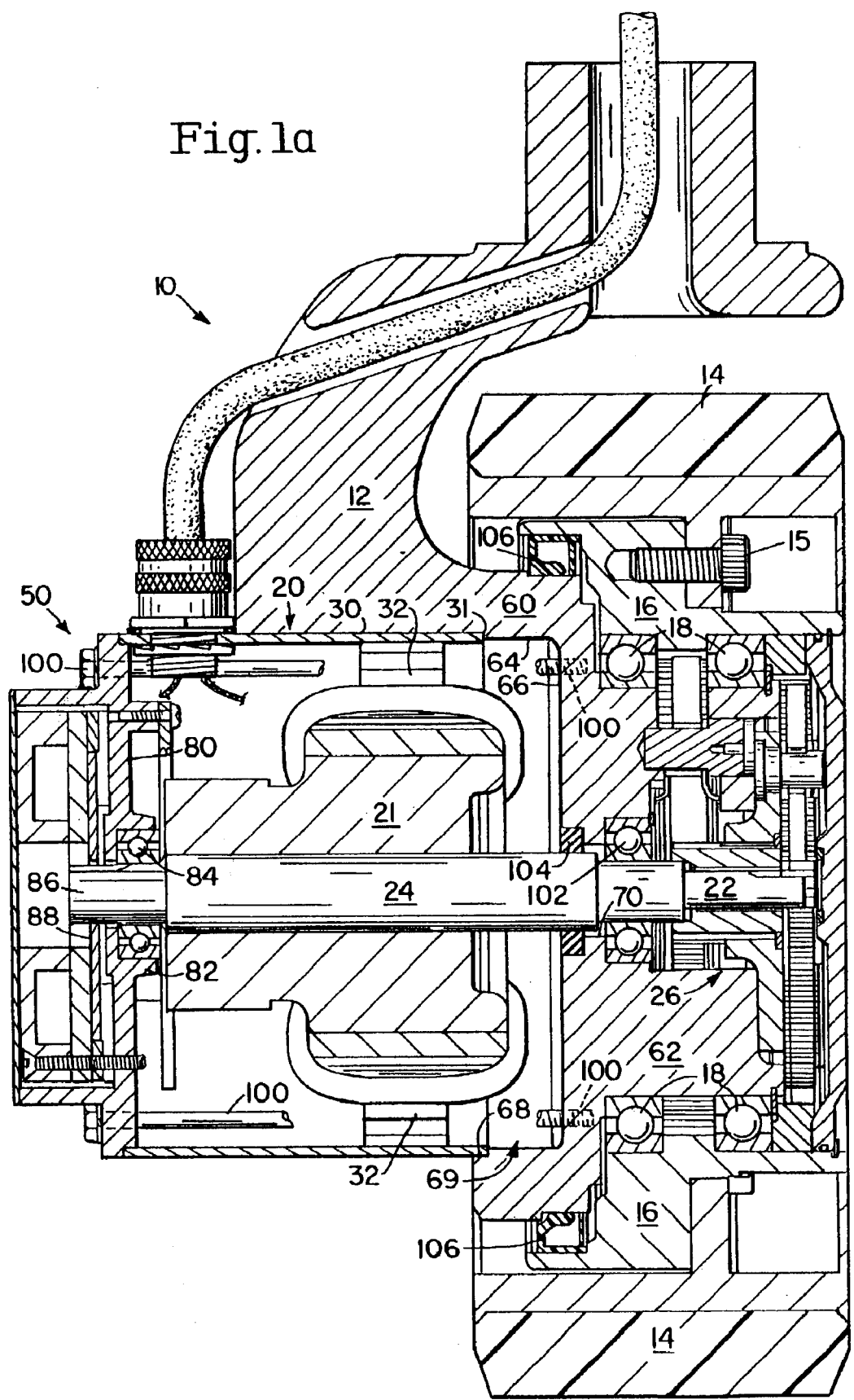
FIG. 1a is a fragmentary sectional view of the wheel assembly of the invention.

As shown in FIGS. 1 and 1a, the open inner end of shell 30 fits within counterbore 68 and chamber 69 and is fastened therein by two elongated through bolts 100 which extend from brake assembly 50 through end plate 80 and shell 30 and its open inner end 31 and thread into end wall 66 of hub section 60. A turned section of the drive end 22 of shaft 24 is rotatably supported in hub section 62 by bearing 102. An oil seal 104 mounted in bore 70 around shaft 24 prevents oil from planetary assembly 26 from entering bore 64 and motor 20. An annular dust seal 106 prevents dirt from entering planetary assembly 26.

From the above description, it is apparent that the number of parts and components utilized in the wheel assembly of the invention are beneficially minimized. For example, because hub section 60 includes bore 64 and its end wall 66 and the enlarged counterbore 68 in which the inner end 31 of shell 30 fits an end plate which would normally attach to inner end 31 can be omitted, since end wall 66 effectively closes the drive end of shell 30. Armature shaft 24 not only rotatably supports armature 21 in bearings 84 and 102, but its elongated drive end 22 fixedly mounts the sun gear of planetary assembly 26. Brake assembly 50 is advantageously fastened to rear or outer end plate 80 and can be quickly and easily removed for maintenance purposes, if necessary. Similarly, if necessary motor 20 can be quickly removed from hub 12 merely by removing through bolts 100.

Figure 9:
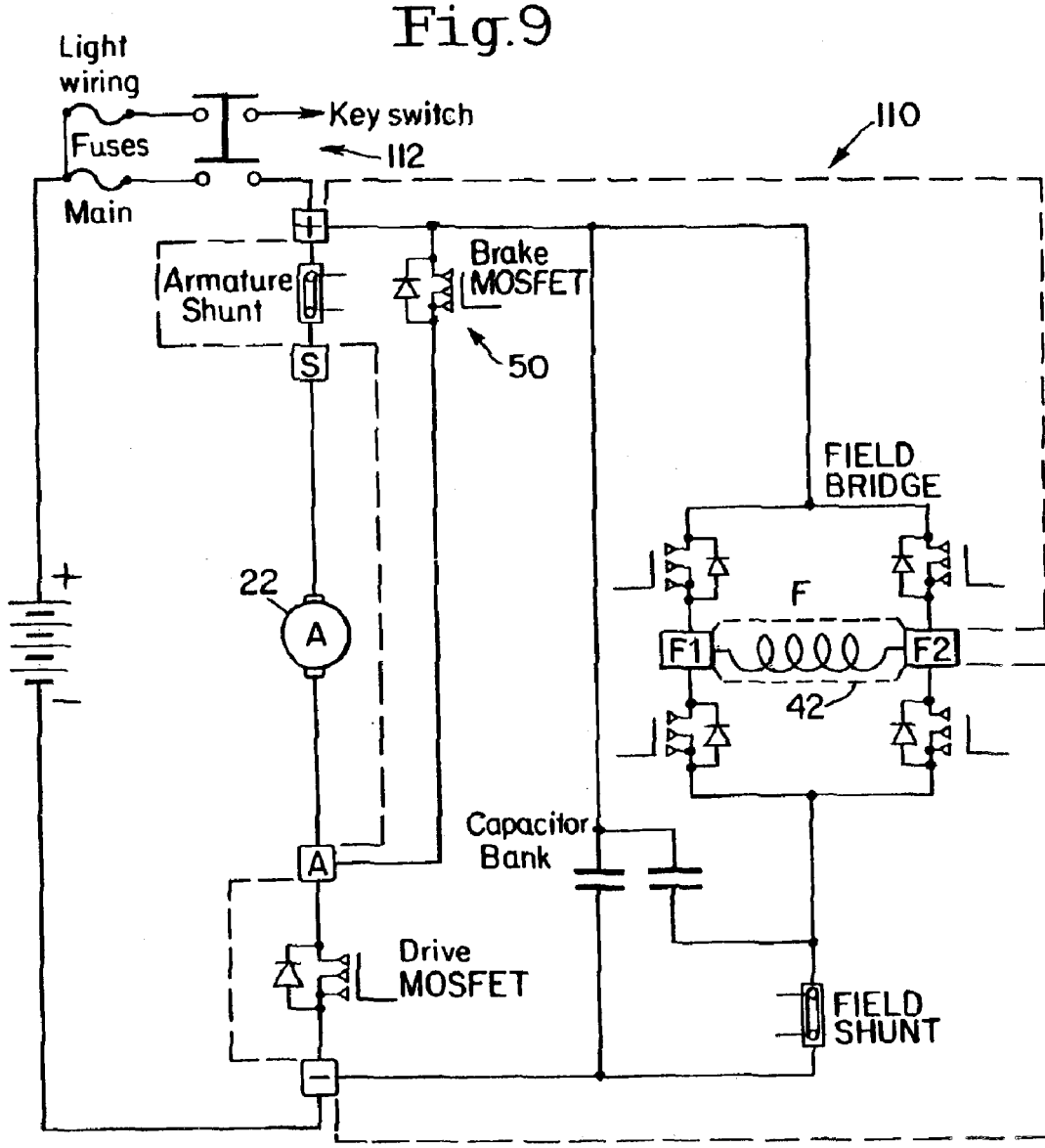
FIG. 9 is a schematic of the electronic control circuitry for the motor.

Referring to FIG. 9, motor 20 is controlled by a standard electronic circuit 110 in which the coils 22 of armature 21 and field coils 42 are in parallel and the field coils may be separately energized for more speed and better control. In addition the direction of current flow though field coils 42 maybe reversed to rotate wheel 14 in a forward or reverse direction. Upon closure of key switch 112, motor 20 is energized and brake assembly 50 is simultaneously energized to release disc 88.

The unique construction of motor 20 results in significant cost savings because of the reduced number of parts, fewer manufacturing operations, less labor and lower material cost. Using a rolled shell 30 in contrast to a thick machined frame produces an overall weight saving of 20 to 25% when compared to conventional DC motors of the same rating. Operating efficiency is also improved due to the powdered metal pole segments which reduce any current losses.

A wound field motor 20 constructed according to the invention is compact, lighter in weight, smaller in size (about 5" long and about 6" in diameter), and less expensive than the conventional DC motors. It can be readily installed within the hub of the wheel assembly 10, and it is capable of providing the horsepower and torque which is required to drive wheel 14. The motor may produce about ¼–1½ HP and preferably operates from a 24 volt DC supply.

Other equivalents, features and advantages of the preferred embodiment of the invention will be apparent to those skilled in the art from a reading of the foregoing detailed description of the preferred embodiment of the invention. However, the invention should not be limited to such preferred embodiment, but only by the following claims.

What is claimed is:

1. A wheel assembly comprising: a hub including a first section having a first bore terminating at an end wall to define a motor-receiving chamber, and a second section extending from said end wall in a direction opposite from said first bore and including a second bore concentric with said first bore; a wheel rotatably carried by said second section and rotatable relative to said hub; a speed reducing means carried by said second section and drivingly connected to said wheel; and a DC motor including a cylindrical shell non-rotatably mounted within said first bore and a field coil assembly fixedly carried within said shell, said motor including an armature fixedly carried on a shaft rotatably supported in said second bore for rotation within said field coil assembly, said cylindrical shell having a first, open end adjacent said end wall, wherein said shaft extends through said end wall and is drivingly connected with said speed reducing means to apply motor torque to rotate said wheel.

2. The wheel assembly of claim 1, said motor including an end plate carried at a second end of said shell axially spaced from said first end, a first bearing carried by said end plate for rotatably supporting one end of said shaft, and a second bearing carried by said hub and axially spaced from said first bearing for rotatably supporting another end of said shaft.

3. The wheel assembly of claim 2, including a seal carried within said hub in surrounding relationship with said shaft adjacent said second bearing to prevent lubricant from said speed reducing means from entering said motor-receiving chamber.

4. The wheel assembly of claim 3, including a brake carried by said end plate and including a brake element non-rotatably carried at said one end of said shaft, wherein said brake is operable to engage said brake element to hold said shaft stationary and to release said brake element upon energization of said motor.

5. The wheel assembly of claim 1, including a brake including a brake element non-rotatably carried on said shaft, wherein said brake is operable to engage said brake element to hold said shaft stationary and to release said brake element upon energization of said motor.

6. The wheel assembly of claim 5, wherein the brake is an electrically operated brake.

7. The wheel assembly of claim 1, including connection means extending from said end plate to said hub to hold said motor within said motor-receiving chamber.

8. The wheel assembly of claim 1, wherein said field coil assembly includes a plurality of powdered metal pole pieces circumferentially spaced within said shell, a plurality of powdered metal pole segments extending between and interconnecting adjacent pole pieces to hold said pole pieces in predetermined angular relationship, and a coil carried by each of said pole pieces.

9. The wheel assembly of claim 8, wherein said field coil assembly is press fitted into said shell.

10. The wheel assembly of claim 8, wherein said motor includes an end plate carried by an end of said shell, a first bearing carried by said end plate for rotatably supporting said shaft, and a second bearing carried by said hub for rotatably supporting said shaft.

11. The wheel assembly of claim 10, including a seal carried by said hub in surrounding relationship with said shaft adjacent said second bearing to prevent lubricant from said speed reducing means from entering said motor-receiving chamber.

12. The wheel assembly of claim 11, including a brake carried by said end plate and including a brake element non-rotatably carried by said shaft, wherein said brake is operable to engage said brake element to hold said shaft stationary and to release said brake element upon energization of said motor.

13. The wheel assembly of claim 12, including connection means extending from said end plate to said hub to hold said motor within said motor-receiving chamber.

14. The wheel assembly of claim 12, wherein the brake is an electrically operated brake.

15. The wheel assembly of claim 1, wherein said cylindrical shell has a wall thickness of about $1/8$ inch.

* * * * *